United States Patent Office.

FREDERICK STEARNS, OF DETROIT, MICHIGAN.

Letters Patent No. 75,806, dated March 24, 1868.

IMPROVED HAIR-DRESSING COMPOUND.

The Schedule referred to in these Letters Patent and making part of the same.

TO WHOM IT MAY CONCERN:

Know all men that I, FREDERICK STEARNS, of Detroit, in the county of Wayne, and State of Michigan, have invented a new and useful Improvement in a Compound for Hair-Dressing; and I do declare that the following is a true and accurate description thereof, reference being had to the accompanying drawings, and to the letters of reference marked thereon, and being a part of this specification.

It has long been known that cocoa-nut fat is one of the best ingredients that can be used in the preparation of a hair-dressing, and nothing but the difficulty of deodorizing it has prevented its very general use. By a series of experiments, I have not only succeeded in deodorizing it, but also in combining it with castor-oil, another vegetable oil, by which its utility as a hair-dressing is very materially increased. Alcohol of a certain strength is required to cut the combined cocoa-nut fat and castor-oil.

Having thus mentioned the nature of my compound, I will now describe its manufacture, and give the proportions of each ingredient used, premising, however, that the proportions should be varied according to the strength of the alcohol, as sometimes it may be impossible to obtain the alcohol of the strength named: I take eighteen pounds of cocoa-nut fat, which I melt in a suitable water-bath, and, when melted, add thirty-two pints of castor-oil. When nearly cool, I add thirty-two pints of alcohol, above eighty-eight per cent. proof, and perfume with any suitable amount of any desired essential oil, or various essential oils in combination.

What I claim as my invention, and desire to secure by Letters Patent, is—

The combination of cocoa-nut fat, castor-oil, and alcohol with any appropriate perfumes, substantially in the proportions named, and for the purposes described.

FREDERICK STEARNS.

Witnesses:
   GEORGE B. SIMONS,
   C. W. HUDSON.